United States Patent
Ferren et al.

(10) Patent No.: US 8,159,521 B2
(45) Date of Patent: Apr. 17, 2012

(54) SYSTEMS AND METHODS FOR ENHANCING TELECONFERENCING COLLABORATION

(75) Inventors: Bran Ferren, Beverly Hills, CA (US); W. Daniel Hillis, Encino, CA (US); Thomas McKnight, Ellicott City, MD (US); Rudy Yukich, Baltimore, MD (US); Braddock Gaskill, Silver Spring, MD (US)

(73) Assignee: Applied Minds, LLC, Glendale, CA (US)

( * ) Notice: Subject to any disclaimer, the term of this patent is extended or adjusted under 35 U.S.C. 154(b) by 1087 days.

(21) Appl. No.: 12/037,898

(22) Filed: Feb. 26, 2008

(65) Prior Publication Data

US 2008/0204545 A1  Aug. 28, 2008

Related U.S. Application Data

(60) Division of application No. 12/036,134, filed on Feb. 22, 2008, and a continuation-in-part of application No. 11/461,373, filed on Jul. 31, 2006, now Pat. No. 7,855,726, which is a continuation of application No. 10/911,079, filed on Aug. 3, 2004, now Pat. No. 7,092,002.

(60) Provisional application No. 60/891,478, filed on Feb. 23, 2007.

(51) Int. Cl.
*H04N 7/14* (2006.01)
(52) U.S. Cl. .............. 348/14.08; 348/14.12; 348/14.09
(58) Field of Classification Search .... 348/14.01–14.16; 370/260–261; 709/204–205
See application file for complete search history.

(56) References Cited

U.S. PATENT DOCUMENTS

| | | | |
|---|---|---|---|
| 3,992,586 A | 11/1976 | Jaffe | |
| 4,378,468 A | 3/1983 | Braun | |
| 5,548,346 A | 8/1996 | Mimura et al. | |
| 5,612,733 A | 3/1997 | Flohr | |
| 5,818,616 A | 10/1998 | Kawai | |
| 5,844,599 A | 12/1998 | Hidin | |
| 5,867,654 A | 2/1999 | Ludwig et al. | |
| 5,960,085 A * | 9/1999 | de la Huerga | 340/5.61 |
| 6,046,767 A | 4/2000 | Smith | |
| 6,128,649 A | 10/2000 | Smith et al. | |
| 6,288,891 B1 | 9/2001 | Hasegawa et al. | |
| 6,577,333 B2 | 6/2003 | Tai et al. | |
| 6,731,334 B1 | 5/2004 | Maeng et al. | |
| 6,887,005 B2 | 5/2005 | Kim | |
| 7,515,174 B1 | 4/2009 | Francisco et al. | |
| 7,679,639 B2 | 3/2010 | Harrell et al. | |
| 2002/0154209 A1 | 10/2002 | Kenoyer et al. | |
| 2003/0043041 A1 | 3/2003 | Zeps et al. | |
| 2003/0103135 A1 | 6/2003 | Liu | |

(Continued)

FOREIGN PATENT DOCUMENTS

| | | |
|---|---|---|
| EP | 0574138 | 5/1993 |
| FR | 2832016 | 5/2003 |

(Continued)

*Primary Examiner* — Melur Ramakrishnaiah
(74) *Attorney, Agent, or Firm* — Michael A. Glenn; Glenn Patent Group

(57) ABSTRACT

An advanced video teleconferencing system facilitates an engaging and realistic video conferencing experience. Key design elements and video, audio, and control capabilities are provided for a video conferencing experience that cannot be attained with conventional methods, which elements and capabilities include careful design of the table and room at each site, supplementary displays showing imagery in a mirrored manner, networked environmental control, an AutoDirector with keyword and gesture recognition, and audio reflection from a display or beam splitter.

17 Claims, 7 Drawing Sheets

U.S. PATENT DOCUMENTS

| | | |
|---|---|---|
| 2003/0149724 A1 | 8/2003 | Chang |
| 2004/0165060 A1 | 8/2004 | McNelley et al. |
| 2004/0213402 A1 | 10/2004 | Ruetschi |
| 2005/0009583 A1 | 1/2005 | Cheung et al. |
| 2007/0279484 A1* | 12/2007 | Derocher et al. .......... 348/14.09 |
| 2008/0068443 A1* | 3/2008 | Thielman et al. ............ 348/14.1 |

FOREIGN PATENT DOCUMENTS

| | | |
|---|---|---|
| JP | A 40-1206765 | 8/1989 |
| JP | A 40-5145916 | 6/1993 |
| JP | A 40-9154115 | 6/1997 |
| JP | A 41-0023383 | 1/1998 |
| JP | A 2002-237991 | 8/2002 |

* cited by examiner

SYSTEMS AND METHODS FOR ENHANCING TELECONFERENCING COLLABORATION

CROSS REFERENCE TO RELATED APPLICATIONS

This application is a divisional of U.S. Ser. No. 12/036,134 filed Feb. 22, 2008 which claims priority to U.S. Provisional Patent Application Ser. No. 60/891,478, filed Feb. 23, 2007 and is a continuation-in-part of U.S. patent application Ser. No. 11/461,373, filed Jul. 31, 2006, now U.S. Pat. No. 7,855,726 which is a continuation of U.S. patent application Ser. No. 10/911,079, filed Aug. 3, 2004, now U.S. Pat. No. 7,092,002, the entirety of each of which is incorporated herein by reference hereto.

BACKGROUND

1. Technical Field

The invention relates to teleconferencing. More particularly, the invention relates to methods for better facilitating collaboration in video teleconferences.

2. Description of the Prior Art

Current video teleconferencing systems are deficient in their ability to support effective collaboration among conference participants, engendering a feeling of remoteness amongst the participants that is contrary to the intended benefits of the system. This deficiency can be attributed to a number of shortcomings that collectively diminish the effectiveness of the communication.

Specifically, current systems do not:

Provide spatial and visual cues that create within the participants a sense of being assembled at a single location;

Enhance the same-room feeling by directing the view of participants towards supplementary displays such that participants at all sites feel they are looking at a common position in space;

Use networked control of the conferencing environments so that lighting and other visual factors appear similar among sites;

Offer adequate software tools for maintaining the synchronization of the conference environments;

React to cues provided within speech patterns and content; and

Provide accurate audio cueing, i.e. remote participant voices often emanate from a location other than where the image of the remote participant is displayed.

It would be advantageous to provide an advanced video teleconferencing system that facilitates an engaging and realistic video conferencing experience.

SUMMARY

The invention is an advanced video teleconferencing system that facilitates an engaging and realistic video conferencing experience. The invention provides key design elements and video, audio, and control capabilities for a video conferencing experience that cannot be attained with today's conventional methods. These include careful design of the table and room at each site, supplementary displays showing imagery in a mirrored manner, networked environmental control, an AutoDirector with keyword and gesture recognition, and audio reflection from a display or beam splitter.

DESCRIPTION

Table and Room Geometry

Figure 1:
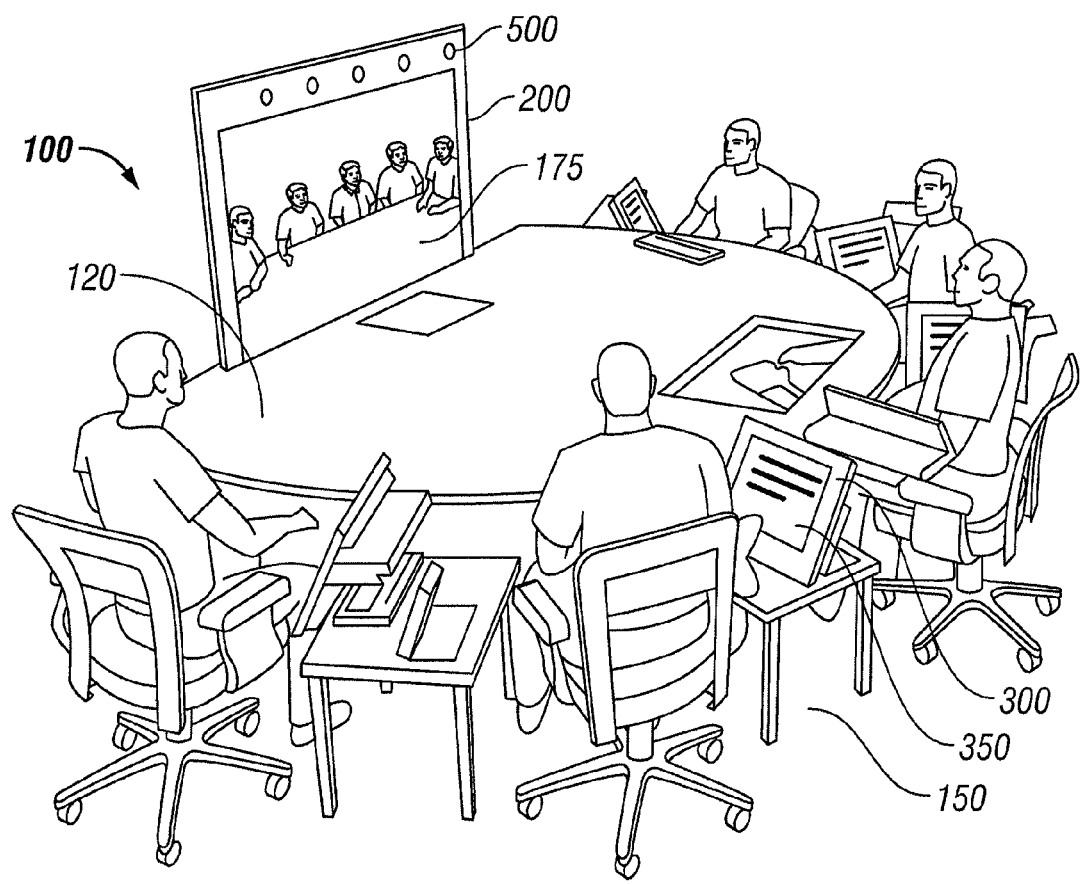
FIG. 1 shows a video teleconferencing site according to the preferred embodiment of the invention.

FIG. 1 shows a video teleconferencing site according to the preferred embodiment of the invention. Each participant at the video teleconference site 100 is seated at a station 150 around the perimeter of the table. A number of video cameras 500 capture images of the local participants in a variety of views (e.g. close up, wide angle) for possible transmission to remote conferencing sites.

The table 120 at each site is positioned and/or shaped such that when an image of a remote site is displayed on the main display 200 at the local site, the image of the table at the remote site appears as a continuation of the table at the local site. The seamless alignment between the physical table at the local site and the displayed table at the remote site reinforces the sense that the local and remote participants are together in a single room. In the preferred embodiment, the table forms a substantially semicircular shape, with the main display 200 aligned with the straight edge of the table. When another site with a similarly shaped table 175 is shown on the display, the arc of the local table appears to be reflected at the other site, providing the illusion of a single, circular table.

Each station is also fitted with a collaboration interface 300. In the preferred embodiment of the invention, the interface consists of a pen-enabled touch screen display 350 with which the participant can view and annotate conference materials (e.g. slide presentations), exchange non-verbal information (e.g. messages) with other participants, access shared applications (e.g. a collaborative whiteboard), and access networked based information (e.g. the World Wide Web). The collaboration interface is preferably positioned to one side of the station so as not to block the view of the participant. Placement of the interface directly to the side of each participant also narrows the space available to the participant, providing an intuitive cue to the participant that he should remain seated within the field of view of the video camera or cameras providing coverage of the participant.

Figure 2:
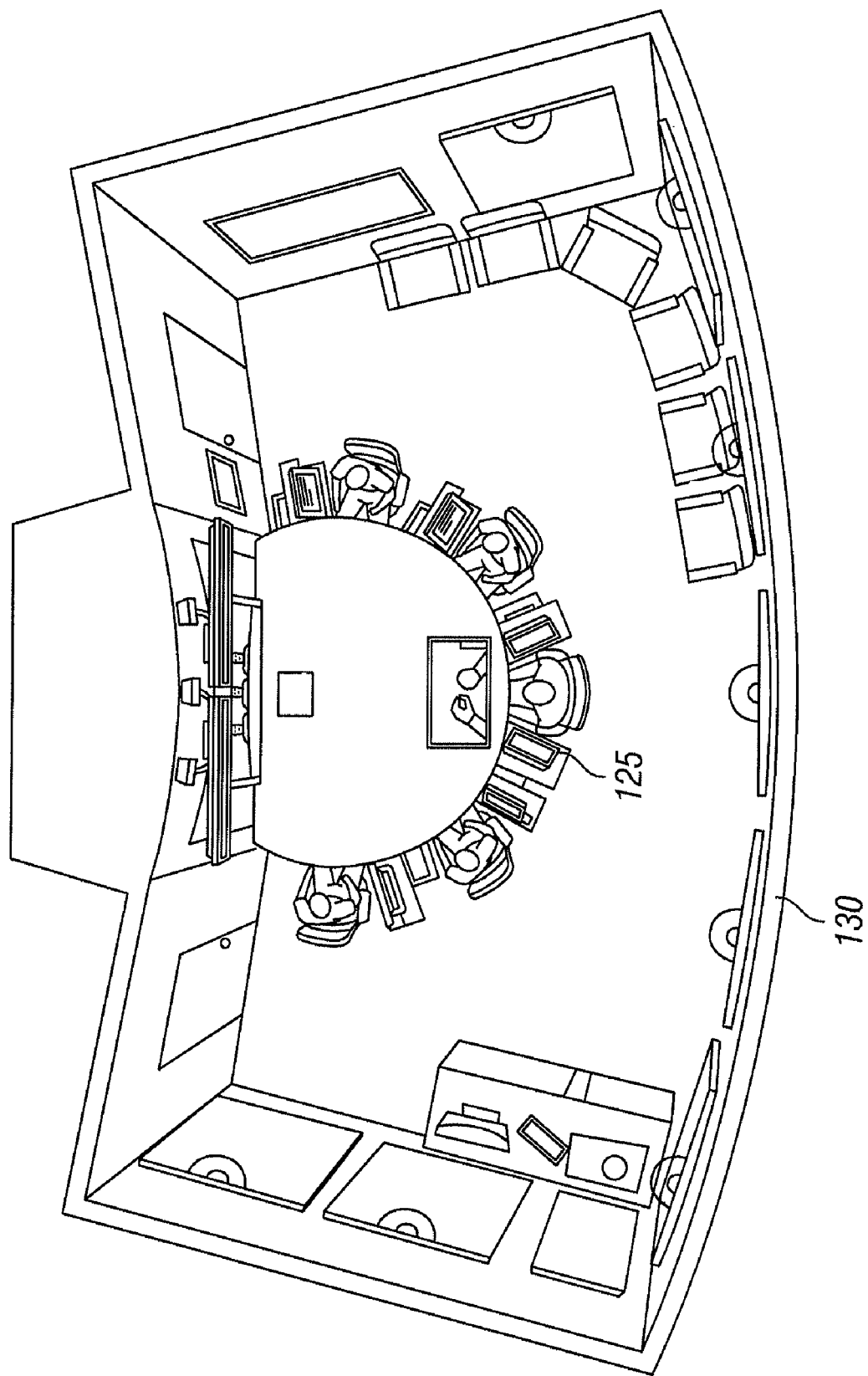
FIG. 2 shows an overhead view of a teleconferencing site according to the preferred embodiment of the invention.

FIG. 2 shows an overhead view of a teleconferencing site according to the preferred embodiment of the invention. As can be seen in the figure, a wall 130 is positioned a short distance behind the participants seated near the apex 125 of the semicircular table. For purposes of the discussion herein, a short distance is short enough that other individuals do not feel comfortable lingering behind the seated participants, e.g. the distance is within an individual's personal space. Best current estimates for personal physical space are about 24.5 inches (60 centimeters) on either side, 27.5 inches (70 centimeters) in front and 15.75 inches (40 centimeters) behind for an average westerner. (http://en.wikipedia.org/wiki/Personal_space) The relatively small clearance between the seated participants and the wall behind the participants ensures that any other individuals in the room will not linger behind the seated participants and therefore will remain out of the field of view of the video cameras intended to show only the seated participants. This alleviates the confusion of the remote participants that would result were individuals other than the seated participants to be periodically entering and leaving the field of view of various video cameras.

Supplementary Displays with Mirrored Imagery

Figure 3:
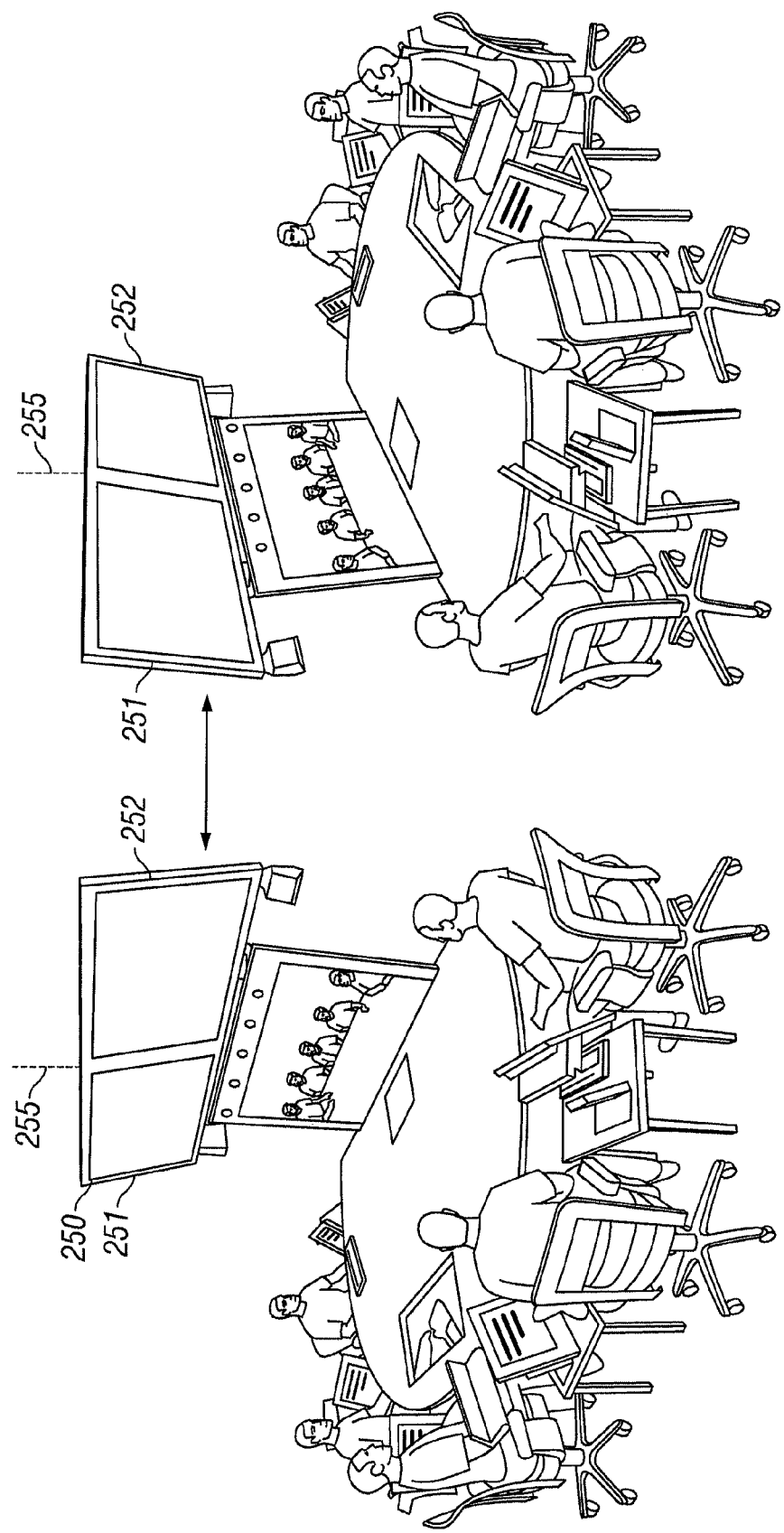
FIG. 3 shows a video teleconferencing site incorporating supplementary displays according to the preferred embodiment of the invention.

FIG. 3 shows a video teleconferencing site incorporating supplementary displays according to the preferred embodiment of the invention. While the main display preferably shows images of participants at remote sites, the supplementary displays 250 are used to show other information, such as maps, slides, text, or video. At each site, the supplementary displays are mounted such that all participants may view them, preferably above the main display. In the preferred embodiment, the supplementary displays are mounted sufficiently offset that when a local participant is viewing a supplementary display, it is clear to remote participants viewing images of the local participant the he is not intending to make eye contact. For purposes of the discussion herein, the size/offset of the supplementary displays are such that when viewed by the local participant, the angular offset between the local participant's eyes and the line of eye-contact with the remote participant is readily perceptible to the remote participant. That is, when the local participant views the supplementary displays, it is readily apparent to the remote participant that the local participant is not making eye contact and is looking somewhere else.

To better quantify, consider: GAZE-2: Conveying Eye Contact in Group Video Conferencing Using Eye-Controlled Camera Direction, Roel Vertegaal, Ivo Weevers, Changuk Sohn and Chris Cheung, CHI '03: Proceedings of the SIGCHI conference on Human factors in computing systems, pages 521-528, 2003, who in turn cite Chen, M. Leveraging the Asymmetric Sensitivity of Eye Contact for Videoconference. In Proceedings of CHI 2002. Minneapolis: ACM Press, 2002. This recount suggests that to avoid the appearance of eye gaze being lowered or otherwise skewed, the video camera needs to be located to within 1 degree horizontally and 5 degrees vertically from the on-screen representation of the eyes of each conversational partner. An intuitive cue is thus provided to the remote participants that their attention should be directed somewhere other than to the eyes of the local participant.

If more than one supplementary display is used, the displays are preferably mounted side by side, as shown in the figure. To better facilitate collaborative discussion, the supplementary displays will typically display the same information at all sites so equipped. However, if the displays at a local and a remote site display the same content on supplementary displays at the same position relative to the participant, the same-room experience is diminished. For example, consider a local and a remote site each with two supplementary displays mounted in a side-by-side configuration above the main display, as shown in FIG. 3. Suppose that the left display 251 at each site shows a map and the right display 252 at each site shows a photograph. Suppose that, based on the current conversation, both the local and remote participants focus their attention on the map. Participants at the local site looking up-and-left to view the map will see remote participants displayed as if they are looking up-and-right at the photo. Conversely, it will appear to the remote participants that the local participants are looking up-and-right at the photo while they are actually looking up-and-left at the map. Neither the local or remote participants are provided a sense that they and their counterparts are looking at a common point in space.

Figure 4:
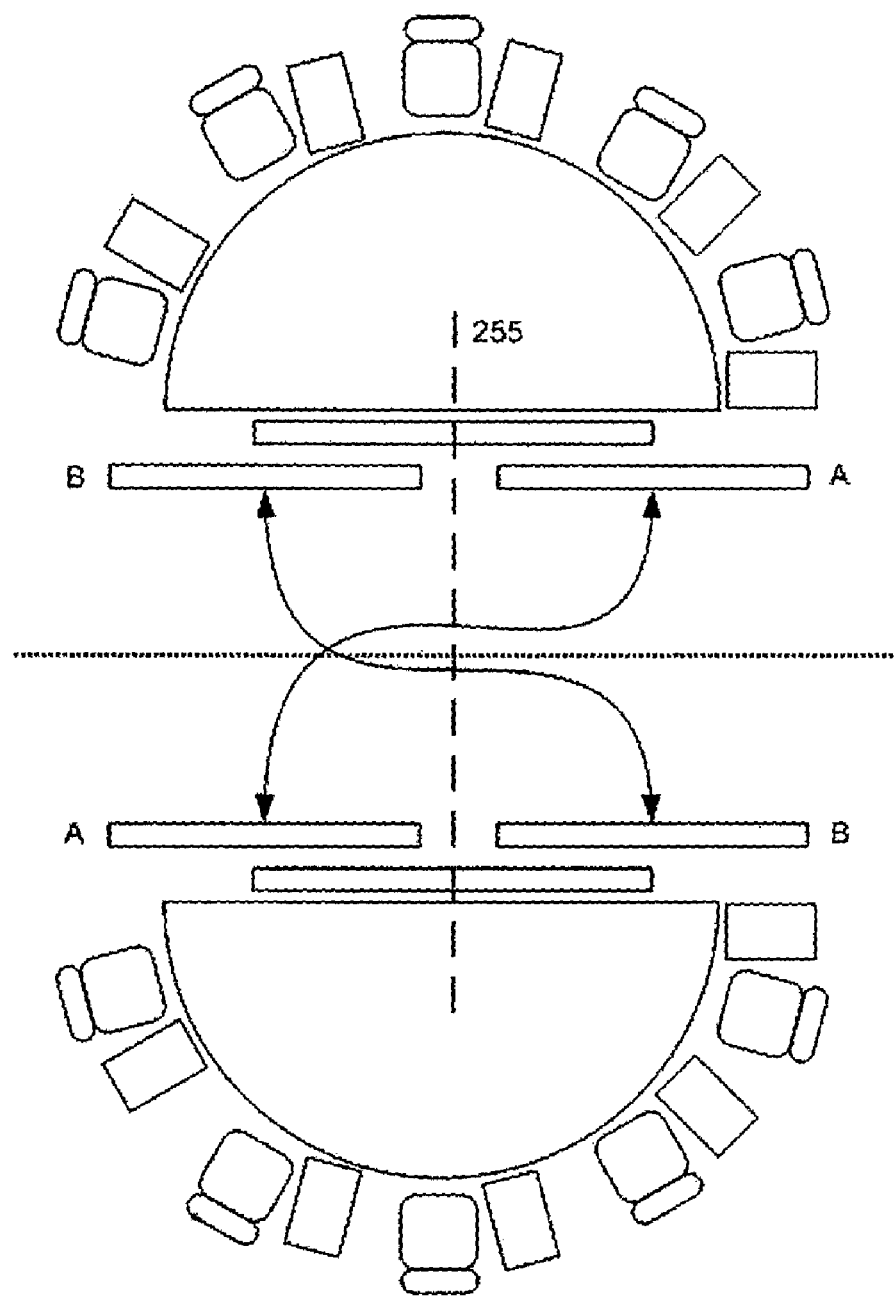
FIG. 4 shows a schematic of the routing of signals to supplementary displays according to the preferred embodiment of the invention.

To address this deficiency, the information routed to the left display at one site is routed to the right display at a second site. This operation is illustrated schematically in FIG. 4. More generally, the content shown on a display at a first site is shown on a corresponding display at the second site positioned in a symmetric position relative to a centerline 255 of the conference site. The invention may thus be extended to more than two supplementary displays. Mirroring the content of the displays in this manner restores the local and remote participants' sense that they are viewing supplementary display content at a common point in space, greatly reinforcing the same-room experience.

Synchronization of Conferencing Environments

To further strengthen the same-room experience of the conference participants, the invention provides a mechanism for synchronizing the environments of the various conference sites.

For example, when a participant at a first site adjusts the lighting controls at the first site, the lighting levels are adjusted at both the first site and at any synchronized sites. This concept may be extended to the audio levels, climate control, and security levels of the conference sites. For example, if an RFID badge worn by a participant entering one site indicates that he does not possess clearance to view material currently displayed on the supplementary displays or collaboration interface, the supplementary displays or collaborative interfaces may be blanked at all sites.

The invention ensures synchronization via a database that stores the conference state. The state of the conference is stored in a hierarchical, tree-like data structure. The root node of the tree corresponds to the entire conference state. Primary branches of the tree may represent lighting, audio, climate, and security. Smaller sub-branches of the tree may correspond to individual banks of lights. Other primary branches of the tree track which participant stations are occupied and the state of the various collaboration tools (e.g. collaborative whiteboard contents and senders, recipients, and content of private messages).

Each site maintains a local copy of the entire conference state, and, at any time, one site is designated as a conference master. Conference sites that wish to have a portion of the conference state synchronized notify the conference master by subscribing as a listener to a particular node within the tree. If a subscribing site detects a change in the conference state (e.g. a participant at the site has adjusted a physical control associated with audio levels) within the portion of the tree radiating from the subscribed node (e.g. the audio levels branch), it informs the conference master of the change in state. The conference master then notifies all sites that have subscribed to the portion of the tree affected by the change in state. The notification contains the updated values of the conference state in the affected region of the tree. Each notified site then updates its local copy of the conference state accordingly.

Thus, the invention stores the conference state in a distributed fashion and maintains synchronization of the conference state in an event driven manner. The redundant storage of the conference state ensures that, should the conference master become unavailable due to a failure (e.g. network outage), a new conference master can be selected.

The database, can, however, be polled for all or a portion of the conference state. This functionality allows sites to join a conference already in progress. Upon joining a conference and subscribing to one or more nodes within the tree, the joining site can poll the database for the subscribed portion of the tree and synchronize its state to the state shared by the conference sites already present.

Finally, each site may additionally store a local state for site dependent information. Such information may include, for example, the lighting levels for lights with no functional equivalent at other sites. While other sites may store similar information, the invention does not provide for subscription and updating of the site dependent information.

Lispy Programming Language

In the preferred embodiment of the invention, the database storing conference state is implemented using Lispy—a novel programming language. Lispy is ideally suited for the synchronized hardware control required by the invention.
Features and Background One feature of Lispy is the ability to link multiple interpreters together over a network and have network transparency of stack symbol lookups. It is essentially a network transparent programming language. This makes Lispy ideal for network-centric applications, such as video conference collaboration systems.

Lispy's other features involve its name/value/next node primitive. Apart from the name field (value/next are equivalent to car/cdr), Lispy is largely similar to Lisp or Scheme in structure, and we attempt to use Scheme function names where applicable.

Lispy has a native Java API, allowing manipulation of Lispy structures in a native Java environment.

Lispy also provides an event notification system that can notify entities of changes to Lispy structures, such as the setting of a value field. Entities can subscribe as listeners to a node, and receive notification of changes made to the node.

This notification system is also used as a communications layer, allowing messages to be passed and broadcast to interested parties anywhere on the network, simply by setting the value field of a known node to the content of the message. This is the basis of all communication within the synchronization system described above.

Earlier, simplified versions of Lispy maintain a network transparent tree configuration and provide message-passing system with a Java interface. The implementation of a dereference function and a few simple extensions, however, have rendered more recent versions of Lispy a true programming language with full Turing Equivalence.
Primitives Lispy is an extension, and thus can use as a value any Java Object. However, for linguistic purposes, there are only three fundamental types that Lispy can handle in external (printable/parsable) format—strings, symbols, and numbers.

A string is enclosed in quotes:
"hello world"

A symbol is just a string of letters and digits, underscore, and hyphen, with no spaces:
mysymbol A number is a string of digits, optionally a decimal expression:
386, 3.14159, 0.34567

Internally, any parsed number is considered a double.

The null symbol has special handling in Lispy. It represents a null value or null pointer.

A symbol-path is a series of symbols separated by periods (".") specifying a path into a tree structure:
"entry.address.city"
Lists Lists of objects can be created by enclosing them in square brackets:
["apple" 3.14 x]
Nodes The fundamental structural type in Lispy is the Node. A Node, analogous to a Lisp cell, has three fields: the name, the value, and the next pointer.
node: (<name> <value> <next>)

The <value> and <next> fields are analogous to the car and cdr cell fields in Lisp. The <name> field provides a symbolic lookup capability which is ideal for configuration applications.

A node can be expressed in Lispy using parenthetical syntax. To specify a node with the name "programmer", the value "braddock", we can input:
(programmer "braddock")

Note that the <next> pointer is not specified explicitly. <next> gets set explicitly, for example in a list.
[(programmer1 "braddock") (programmer2 "Rudy")]

A list is, in fact, nothing but a series of linked Nodes. Above the list was written as:
["apple" 3.14 x]

It is actually implemented inside Lispy as:
[(null "apple") (null 3.14) (null x)]
where the <name> fields are implicitly all null.

The <value> field inside a full node expression may also be a list, such as
(authors ["Clarke" "Asimov" "Vonnegut"])

In this case, internally the <value> field is a pointer to the first Node of the list.

Also, a special syntax can be used to build trees of value-name pairs.

```
(braddock
    (phone "617-230-9108")
    (address
        (street "3100 St. Paul St.")
        (city "Baltimore")
        (state "Md")
    )
)
```

Functions

A function can be called by naming the function as the first value in a list. For example:
[print "hello world"]

Functions can take multiple parameters, such as
[wait-for-change my.semaphore "1"]

Multiple functions can be placed in a list for sequential execution:

```
[
    [print "hello world"]
    [set! x 386]
    [print "The value of x is:"]
    [print x]
]
```

Lambda

An essential yet infrequently used function is Lambda. It pushes a scoped variable onto the stack and then executes another function with it.

[lambda (x "hello") [x "world"]]

Inclusion of Lambda guarantees Turing Equivalence, and can be the basis for many other functions.

Context (The Stack)

The symbol stack is called the Context of execution, since it is not a simple flat stack. All symbols that are specified for interpretation must have a corresponding entry in the Context, including core functions. The current context can be viewed using the "get-context" function. For example:

[write [get-context]]

which will print the symbol table. Note that all data in the table will be printed, which could be enormous.

The Context need not be viewed as anything special. It is just a list of name/value Nodes like any other structure in Lispy. In fact, in many ways Lispy was designed to be one big tree-structured symbol stack.

Existing symbols may be modified or added to the stack with the set! function:

[set! x "hello world"]

One of the more interesting features of Lispy over other lambda languages like Lisp or Scheme is its symbol-path capability. Since every list of nodes may have it's name fields referenced as a stack, there is a more structured context that a traditional flat stack. For example:

```
[set! last-names
  [
    (braddock "Gaskill")
    (brian "O'Reilly")
    (rudy "yukich")
  ]
]
``` sets the symbol "last-names" to the specified list. The entire list can be treated as first-class structured symbols. For example:

[print last-names.brian]

The list itself can also be treated as an object, of course. For example:

[print last-names]

will print the entire contents of the last names list.

Formal Syntax

This is the approximate formal syntax of Lispy in Augmented BNF:

```
WS = SPACE/HTAB/CR/NL
number = (1*DIGIT*1"."*DIGIT)/("."1*DIGIT)
char-val = DQUOTE*(%x20-21/%x23-7E)DQUOTE
symbol = ALPHA*(ALPHA/DIGIT/"-"/"_")
lexical-token = symbol/char-val/number/"("/")"/"/"["/"]"
symbol-path = symbol*("."<symbol>)
sym-name = symbol-path
sym-value = symbol-path/char-val/list/number/implicit-list
list = "[" node-expr *(1*WS<node-expr>) "]"
implicit-list = full-node-expr*(1*WS<node-expr>)
node-expr = full-node-expr/value-node-expr
full-node-expr = "(" sym-name 1*WS sym-value ")"
value-node-expr = sym-value
```

Autodirector

The invention incorporates an AutoDirector that emulates the behavior of a highly experienced human video director. The AutoDirector automatically selects, from among one or more video camera feeds and other video inputs, a video signal for transmission to remote video conferencing sites, and, optionally, a video signal for display on one or more supplementary displays. In this manner, the flow of conversation among the participants of a local video conferencing site is seamlessly reconstructed at the remote teleconferencing site for viewing by the remote participants and topical video content is routed to the supplementary displays. In conferences incorporating more than two sites, the AutoDirector preferably selects which of the several video signals received from remote sites will be shown on the primary local display.

Keyword Based Video Selection

As noted in the referenced patent application, the AutoDirector relies primarily upon audio activity (i.e. the presence or absence of speaking as detected by a particular microphone) to determine which of the various available video feeds and video inputs it will select.

However, the AutoDirector may also respond to the content of the audio signals obtained from a microphone. Specifically, the AutoDirector may select a particular video feed or video input upon recognizing one of a number of predetermined keywords stored in a database. For example, the AutoDirector may select a video feed displaying a participant if the participant's name is detected within one or more audio signals. A particular video input (e.g. a slide presentation) may be displayed (either on the main or supplementary displays) if a corresponding keywords (e.g. slide) is detected. The AutoDirector thus responds to verbal cues inherently present within the conversation.

Additionally, predefined, explicit verbal commands may be used. For example, a particular participant may request that he be shown by saying "show me". A conference administrator may verbally override the AutoDirector's automatic behavior by saying "show Bob". Finally, a particular video input may be selected with a command such as "show document".

Gesture Based Video Selection

The AutoDirector is also capable of recognizing and reacting to gestures made by the participants. Using techniques well known in the prior art, the AutoDirector can compute the look-direction and gaze-direction of one or more participants and from this information determine a focus of attention within the room. The focus of attention may then be considered in selecting an appropriate signal for transmission. For example, if the AutoDirector determines that a specific participant is the focus of attention within the conferencing site, it may select a video feed that displays the participant. The AutoDirector may also determine the focus of attention by recognizing manual gestures such as pointing. In some instances, the gesture recognized may suggest that the participant performing the gestures is himself the focus of attention. For example, the AutoDirector may select for transmission a video feed showing a participant pounding the table in frustration or raising his arms in frustration.

Reflected Audio

In conventional video teleconferencing systems, audio from the remote site is typically produced by speakers separated from the local video display. The audio heard by participants does not appear to emanate from the displayed image of the remote participant. While a stereo speaker configuration of speakers positioned on opposite sides of the display does provide a stereo image centered on the display, the effect provided is not the same as a single source emanating from the speaker. The resulting false audio cueing engenders a sense of fatigue among the participants.

Audio Reflected from Main Display

To provide accurate audio cueing, the invention incorporates an audio speaker directed at the main display on which images of the remote participants are displayed. The audio emanating from the speaker is reflected from the display and towards the listening participants. The conversation rendered by the audio speaker is thus perceived to emanate directly from the participant displayed on the monitor.

Figure 5:
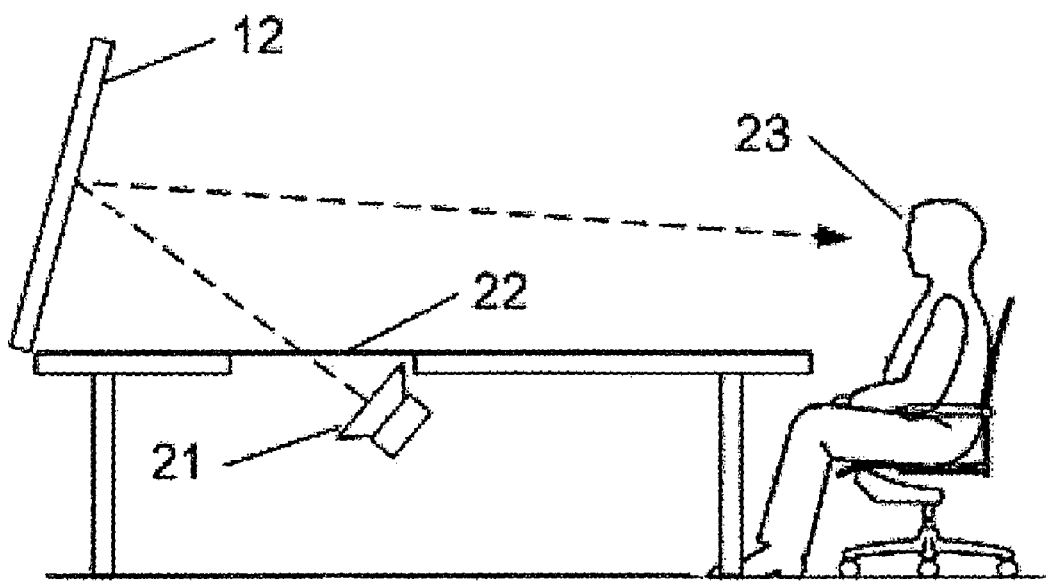
FIG. 5 depicts the reflection of audio from the main display towards the participants according to the invention.

FIG. 5 depicts the reflection of audio from the main display towards the participants according to the invention. The speaker 21 is mounted beneath the surface of the table under an acoustically transparent material 22 and aimed at the main display 12. Audio is thereby reflected from the main display towards the participants 23, giving the illusion that the audio is originating from the center of the display.

This effect may be further enhanced by selecting a highly directional audio speaker and shielding the speaker in a manner that blocks the straight line transmission pathways between the speaker and the listening participants. For example, in the preferred configuration, the audio speaker is recessed within a table on which the main display rests. The recess is shaped and the speaker positioned to allow audio to emanate towards the monitor but not towards the listening participants.

Audio Reflected from Beam Splitter

Figure 6:
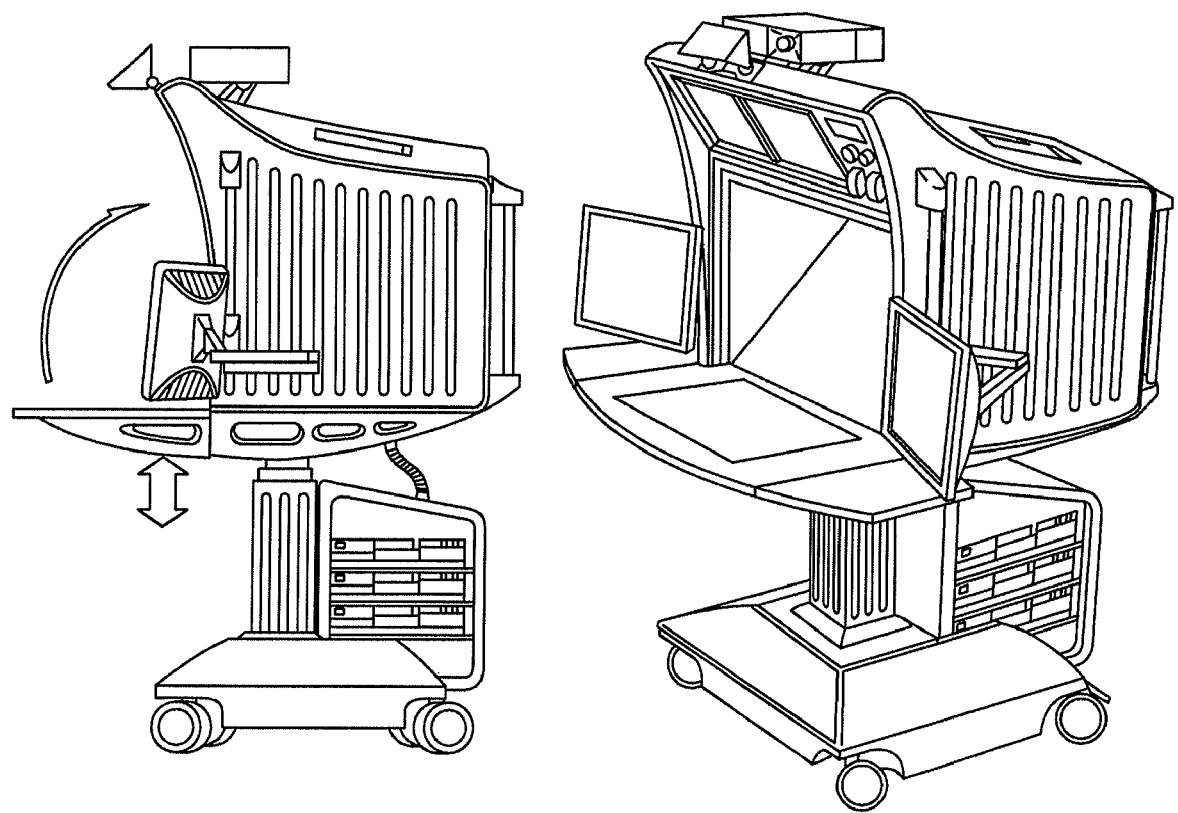
FIG. 6 shows a one-person video teleconferencing station according to the preferred embodiment of the invention.

FIG. 6 shows a one-person video teleconferencing station according to the preferred embodiment of the invention. In such a one-person station, the table-mounted reflected audio configuration described above is unsuitable for two reasons:

There may be insufficient table space between the local participant and the display to mount the speaker without risking obstruction of the speaker by objects on the table, such as papers and the local participant's arms, and A beam splitter is positioned in front of the display to provide improved eye contact with the remote participant, and the angle of the beam splitter will reflect sound away from the local participant.

Figure 7:
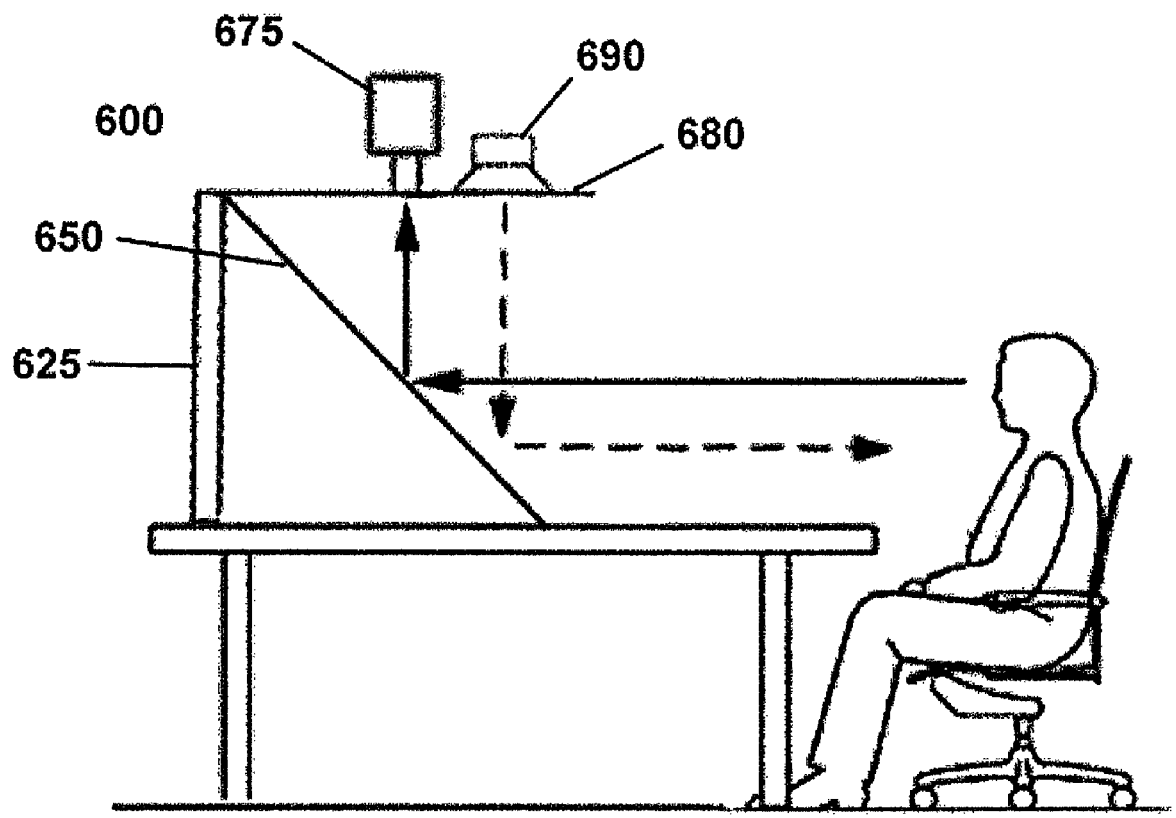
FIG. 7 shows a one-person video teleconferencing station with audio reflected from a beam splitter according to the preferred embodiment of the invention.

FIG. 7 shows a one-person video teleconferencing station with audio reflected from a beam splitter. As mentioned above, a beam splitter 650 is positioned within the station 600 and in front of the display 625 at approximately a forty-five degree angle. A video camera 675 is positioned above the beam splitter to capture an image of the local participant as reflected from the front surface of the beam splitter. The participant views the display through the beam splitter. A darkened enclosure 680 surrounding the display, camera, and beam splitter ensures that the participant's view of the display and the camera's view of the participant are not corrupted by ambient light. A speaker 690 is mounted in the same plane as the camera, above the beam splitter. Sound emanating from the speaker is reflected by the beam splitter towards the participant, providing the illusion that the audio is originating from the center of the display, coincident with imagery of the remote participants.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for synchronizing an environment of each of two or more conference sites to strengthen a same-room experience of conference participants at each of said two or more conference sites, comprising any of:

means for adjusting lighting levels at both the first site and at any synchronized, remote sites when a participant at said first site adjusts lighting controls at said first site; and a database for storing conference state in a hierarchical, tree-like data structure to effect synchronization between each of said two or more conference sites;

wherein a root node of said tree-like structure corresponds to an entire conference state; and wherein primary branches of said tree-like structure represent any of lighting, audio, climate, and security.

2. The apparatus of claim 1, further comprising:

means for adjusting any of audio levels, climate settings, and security levels at both the first site and at any synchronized, remote sites when a participant at said first site adjusts any of audio levels, climate setting, and security levels at said first site.

3. The apparatus of claim 2, said means for adjusting security levels comprising:

means for detecting when a participant entering one site does not possess clearance to view material currently displayed on any of supplementary displays and a collaboration interface; and means for blanking any of said supplementary displays and collaborative interface at all sites when said participant is detected by said detecting means.

4. The apparatus of claim 1, wherein a smaller sub-branch of said tree-like structure corresponds to an individual bank of lights.

5. The apparatus of claim 1, wherein at least one primary branch of said tree-like structure tracks any of which participant stations are occupied and a state of collaboration tools associated with said participant stations.

6. The apparatus of claim 5, wherein said associated collaboration tools comprise any of:

collaborative whiteboard contents and senders, recipients, and contents of private messages.

7. The apparatus of claim 1, wherein each site maintains a local copy of an entire conference state and, at any time, one site is designated as a conference master;

wherein conference sites synchronize a portion of a conference state by notifying said conference master by subscribing as a listener to a particular node within said tree-like structure;

wherein if a subscribing site detects a change in said conference state within a portion of said tree-like structure radiating from a subscribed node, it informs said conference master of said change in state;

wherein said conference master then notifies all sites that have subscribed to said portion of said tree-like structure affected by said change in state;

wherein said notification contains updated values of said conference state in said affected portion of said tree-like structure; and wherein each notified site then updates its local copy of said conference state accordingly.

8. The apparatus of claim 1, wherein said database stores a conference state and maintains synchronization of said conference state.

9. The apparatus of claim 8 wherein state is maintained in an event driven manner.

10. The apparatus of claim 8, wherein state is stored in a distributed fashion.

11. The apparatus of claim 8, wherein said database effects redundant storage of said conference state.

12. The apparatus of claim 8, wherein said state ensures that a new conference master is selected should an existing conference master become unavailable due to a failure.

13. The apparatus of claim 1, further comprising:
   means for polling said database for all or a portion of said conference state;
   wherein sites can join a conference already in progress;
   wherein upon joining a conference and subscribing to one or more nodes within said tree-like structure, said joining site polls said database for a subscribed portion of said tree-like structure and synchronizes its state to a state shared by conference sites already present in said conference.

14. The apparatus of claim 1, wherein each site additionally stores a local state for site dependent information.

15. The apparatus of claim 1, further comprising:
   a network transparent programming language for implementing said database, comprising means for linking multiple interpreters together over a network and for providing network transparency of stack symbol lookups.

16. The apparatus of claim 15, said programming language further comprising:
   an event notification system for notifying sites of changes to structures;
   wherein sites can subscribe as listeners to a node, and receive notification of changes made to said node.

17. The apparatus of claim 16, said notification system further comprising:
   a communications layer for passing and broadcasting at least one message to interested parties anywhere on a teleconference site network by setting a value field of known node to the content of said message.

* * * * *